United States Patent [19]

Baillargeon

[11] Patent Number: 4,966,242

[45] Date of Patent: Oct. 30, 1990

[54] ALL-TERRAIN VEHICLE

[75] Inventor: Bernard Baillargeon, Victoriaville, Canada

[73] Assignee: Les Entreprises Bernard Baillargeon Inc., Victoriaville, Canada

[21] Appl. No.: 234,573

[22] Filed: Aug. 22, 1988

[51] Int. Cl.[5] ............................................. B62D 11/20
[52] U.S. Cl. .................................. 180/9.44; 180/9.46; 180/242; 280/400; 280/421; 305/44
[58] Field of Search ...................... 180/9.44, 9.46, 9.1, 180/242; 305/35 EB, 44; 280/400, 421

[56] References Cited

U.S. PATENT DOCUMENTS

| 2,342,407 | 2/1944 | Tourneau | 280/492 |
| 3,035,654 | 5/1962 | Nuttall, Jr. et al. | 180/9.44 X |
| 3,473,619 | 10/1969 | Dion | 180/9.44 |
| 3,650,343 | 3/1972 | Helsell | 180/9.4 |
| 3,696,878 | 10/1972 | Nelson | 180/9.46 |
| 3,937,289 | 2/1976 | Dickinson | 180/9.44 |
| 4,072,203 | 2/1978 | Pierson | 180/9.44 |

FOREIGN PATENT DOCUMENTS

| 622314 | 6/1961 | Canada . |
| 748330 | 12/1966 | Canada . |
| 832855 | 1/1970 | Canada . |
| 849972 | 8/1970 | Canada . |
| 954170 | 9/1974 | Canada . |
| 1012187 | 6/1977 | Canada . |
| 1077399 | 5/1980 | Canada . |
| 0066677 | 12/1982 | European Pat. Off. . |
| 2454021 | 5/1976 | Fed. Rep. of Germany . |
| 2517185 | 10/1976 | Fed. Rep. of Germany | 180/9.46 |
| 2823519 | 10/1979 | Fed. Rep. of Germany . |
| 1209973 | 9/1959 | France . |
| 233326 | 1/1944 | Switzerland . |

OTHER PUBLICATIONS

Kassbohrer Advertizing Brochure, Piston Bully.

Primary Examiner—Mitchell J. Hill
Attorney, Agent, or Firm—Foley & Lardner, Schwartz, Jeffery, Schwaab, Mack, Blumenthal & Evans

[57] ABSTRACT

There is disclosed an all-terrain vehicle having a front and a rear body frame connected by an articulated joint for allowing relative lateral oscillation of the frames about an oscillation axis parallel to the longitudinal axis of the front body frame and located above both frames. The joint simultaneously allows for relative pivoting movement of the frames about a pivot axis which is perpendicular to the oscillation axis. The vehicle is driven by four pressure-fluid operated motor assemblies of which the motor output shafts are coaxial two-by-two and are mounted to extend laterally outwardly of the frames and on which shafts are operatively mounted endless track assemblies for winter use, particularly, or pneumatic tires. The motors are fed in pressure-fluid by piping connected to pumps actuated by an engine mounted on the front body frame. At least that part of the piping that traverses the body frames, at the articulated joint, is flexible.

15 Claims, 5 Drawing Sheets

ALL-TERRAIN VEHICLE

BACKGROUND OF THE INVENTION

1. Field of the Invention

The present invention relates to improvements in an all-terrain vehicle made up of a front and of a rear vehicle body of which the frames are connected by an articulated joint to allow for relative oscillation and pivoting of the frames.

2. Description of the Prior Art

An all-terrain vehicle, of the above general type and for use as a snow cat for grooming snow slopes, is disclosed in U.S. Pat. No. 3,937,289. It involves a vehicle of the type concerned wherein the front and rear body frames are connected together by an articulation joint allowing rolling motion, that is lateral oscillation about an axis which lies in the plane of one of the two body frames. CA 1,077,399 relates to a dual-unit all-terrain vehicle wherein the two body frames are also interconnected by an articulation joint and, as it appears, lateral oscillation is about an axis lying in the plane of one of the two body frames. In both cases, also, propulsion of the two pairs of endless-track assemblies, one pair for each body frame, is through a conventional rather rigid mechanical drive involving a universal connection extending between the two frame bodies transversely of the articulation joint. Mainly because of these two constructional features, such vehicles lack stability and flexibility particularly in very uneven terrain.

Other patents as follows, less pertinent than those mentioned above, are also known to the present applicant:

Canadian Patent Nos.
622.314 of 1961
748.330 of 1966
832.855 of 1970
849.972 of 1970
954.170 of 1974
1.012.187 of 1977

SUMMARY OF THE INVENTION

It is a main object of the invention to provide an all-terrain vehicle having improved stability and flexibility when travelling over rough terrain, steep inclines, marshland and similar grounds. This is obtained particularly by having the axis of lateral oscillation or roll axis, in the articulation joint connecting the vehicle front and rear body frames, located above the two frames and extending parallel to the longitudinal axis of one of the frames; advantageously the front frame. In conjunction therewith, two pairs of pressure-fluid motors, one pair on each body frame, are used to propel the ground-engaging traction elements, that may be endless-track assemblies or sets of pneumatic tires.

More specifically and stated broadly, the invention is an all-terrain vehicle having a front and a rear body frame interconnected by an articulation joint for allowing relative lateral oscillation of the frames about an oscillation axis which is parallel to the longitudinal axis of one of the body frames, preferably the front body frame, and which is located above both of the frames. The same articulation joint also permits relative pivoting motion of the body frames about a pivot axis perpendicular to the oscillation axis. The vehicle has four motor assemblies each including a pressure-fluid operated motor having an output shaft. Two of the motor assemblies are mounted on the front body frame with their output shafts coaxial and extending laterally outwardly of the front body frame. The other two motor assemblies are mounted on the rear body frame in a similar manner. Pressure-fluid is supplied to the motors by a pressure-fluid generating means including fluid piping of which at least the portion extending between the two body frames is flexible. Finally, the vehicle is provided with four ground-engaging traction means, each connected to one of the output shafts.

In a preferred embodiment, the front body frame has a rear end and the rear body frame has a front end, the articulation joint being provided between these ends and comprising: a first articulation member and means mounting this first member on one of the body frame ends for its oscillation about the said oscillation axis; a second articulation member solid with the other of the body frame ends, and means joining the two articulation members together for allowing the aforementioned relative lateral oscillation and relative pivoting movement of the body frames.

These articulation members may be in the form of flat plates and the joining means may comprise: a pair of top vertically spaced parallel ears and a pair of bottom vertical spaced parallel ears projecting perpendicularly from one of the flat plates toward the other plate; a top bracket and a bottom bracket projecting perpendicularly from the other of the plates toward the one of the plates and being respectively received between the pairs of ears, and pivot pin means including a pair of pins extending perpendicularly of and through the ears and brackets for allowing the relative pivoting movement of the body frame.

For use particularly although not exclusively on snow, the ground-engaging traction means are endless-track assemblies, each of which comprises: an endless traction belt and a sprocket wheel for driving the belt into rotation, the sprocket wheel being operatively connected to the output shaft of one of the motor assemblies; an elongated idler-wheel bar mounted, intermediate the ends thereof, on the mounting means for the one of the motor assemblies for rocking motion of the bar about a rock axis parallel to the rotation axis of the output shaft, and idle wheels mounted at the ends of the rocking bar for free rotation and for operative contact with the traction belt.

For use on firmer ground, the ground-engaging means are pneumatic tire means operatively connected to the output shafts of the motor assemblies.

Other features and advantages the invention will appear from the description that follows of preferred embodiments thereof having reference to the appended drawings.

BRIEF DESCRIPTION OF THE DRAWINGS

FIG. 3 is a diagrammatic top plan view, partly broken away, of the vehicle of FIG. 1 while FIG. 4 is a side elevation view;

FIG. 5 is a front elevation view of the vehicle intended to show the lateral oscillation of the front body unit with respect to the rear body unit;

DESCRIPTION OF THE PREFERRED EMBODIMENT

Figure 1:
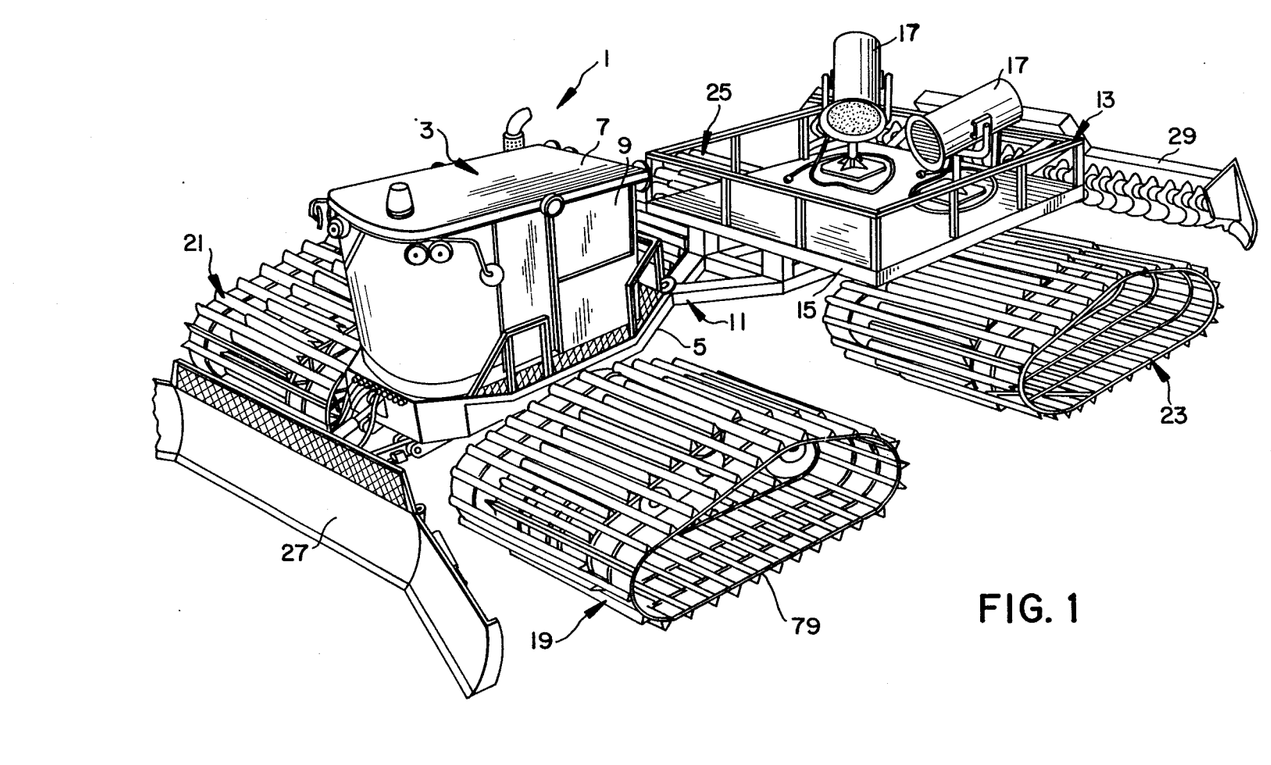
FIG. 1 is a pictorial view of an all-terrain vehicle incorporating the improvements of the invention and conceived for use in grooming ski slopes.

FIG. 1 shows an all-terrain vehicle 1 conceived especially for grooming ski slopes and traversing snow covered areas. It has a front vehicle body 3 having a generally flat body frame 5 supporting a driver's cab 7 containing a power generator 9 providing pressure oil for propelling the vehicle 1. Behind and connected to it by an articulated joint 11, is a rear vehicle body 13 also having a generally flat body frame 15 in the form of a platform carrying snow-throwing guns 17. The vehicle bodies 5, 15, are propelled each by a pair of ground-engageable traction means in the form of wide endless-track assemblies 19, 21, 23, 25. The front body 3 may have a standard snow shovel 27 and the rear body 13 a snow-working harrow 29.

Figure 2:
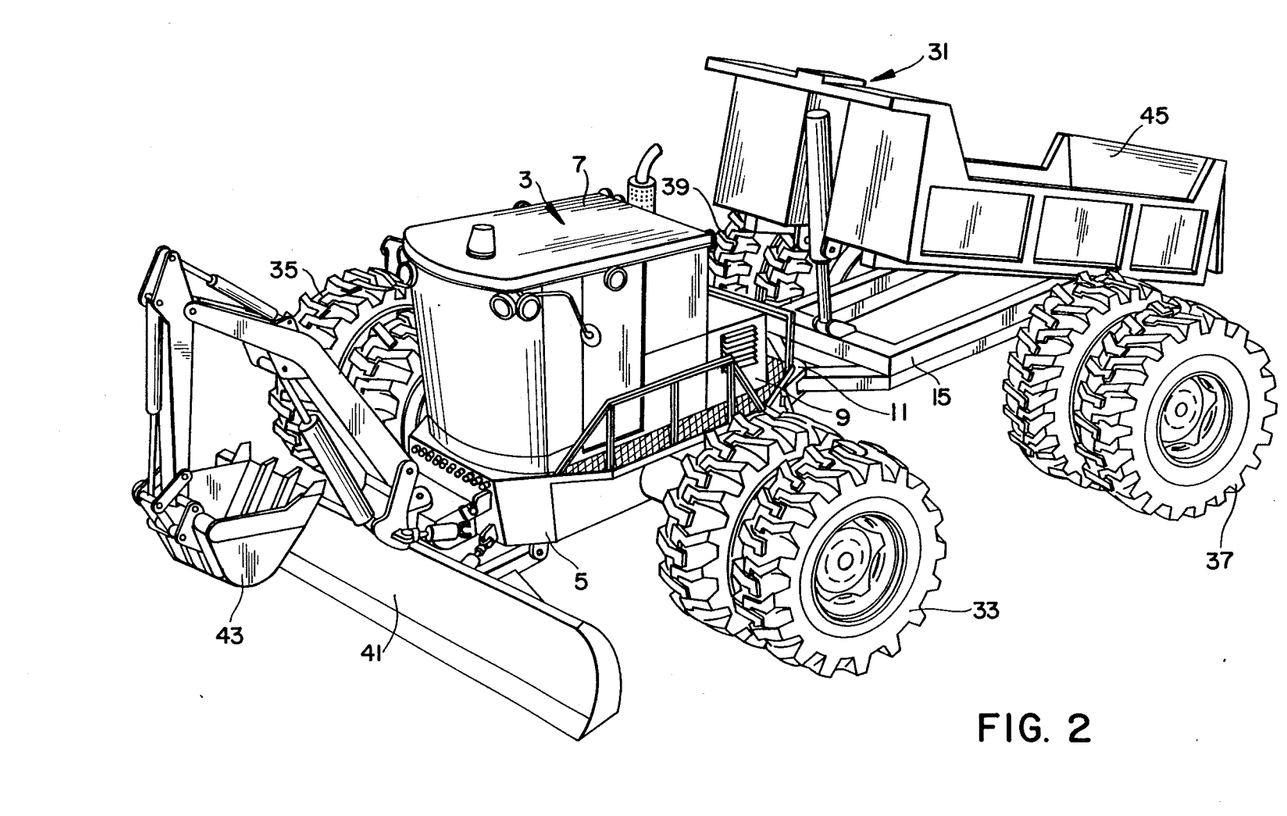
FIG. 2 is a view similar to that of FIG. 1 conceived for working soil and carrying loads.

FIG. 2, on the other hand, illustrates an all-terrain vehicle 31 having the same general vehicle components 3, 5, 7, 9, 11, 13 and 15 as in the vehicle of FIG. 1 but being designed for working the soil and, for that purpose, the ground-engaging traction means are sets of conventional twin tires 33, 35, 37, 39, while being provided, at the front, with an earth levelling shovel 41 and a back-digger 43. The rear frame 15 has a tipping bucket 45 for carrying various earth loads or the like.

Figures 3, 4, 5:
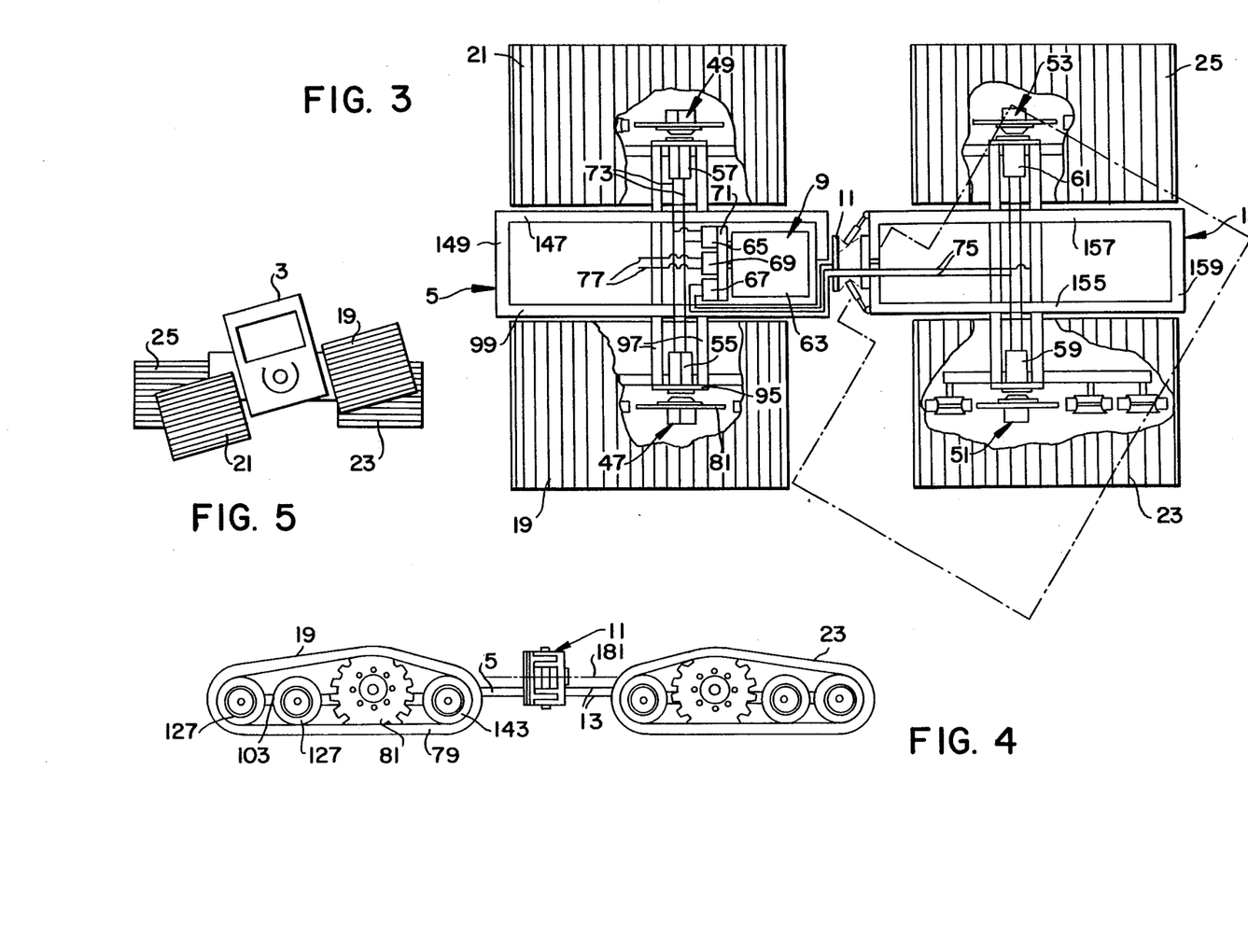

Referring to FIG. 3, the endless track assemblies 19, 21, 23, 25, are powered by motor assemblies 47, 49, 51, 53, including hydraulic motors 55, 57, 59, 61, mounted on the frames 5, 13, so that their output shafts be coaxial two-by-two and laterally extend outwardly of the respective frames 5, 13.

Pressure-oil, which drives the hydraulic motors 55–61, is obtained from the power generator 9 which includes an engine 63 driving three pumps 65, 67, 69, through a power take-off mechanism 71. Pump 65 feeds operating oil to the front motors 55, 57, through piping 73; pump 67 feeds operating oil, to the rear motors 59, 61, through piping 75 while the third pump 69 feeds operating oil, through piping 77, to accessories controlled within the driver's cab 7.

For greater flexibility in the operation of the vehicle and between the body frames 5, 13, at least the portion of the second piping 75, which extends between the frames, is flexible.

Figure 6:
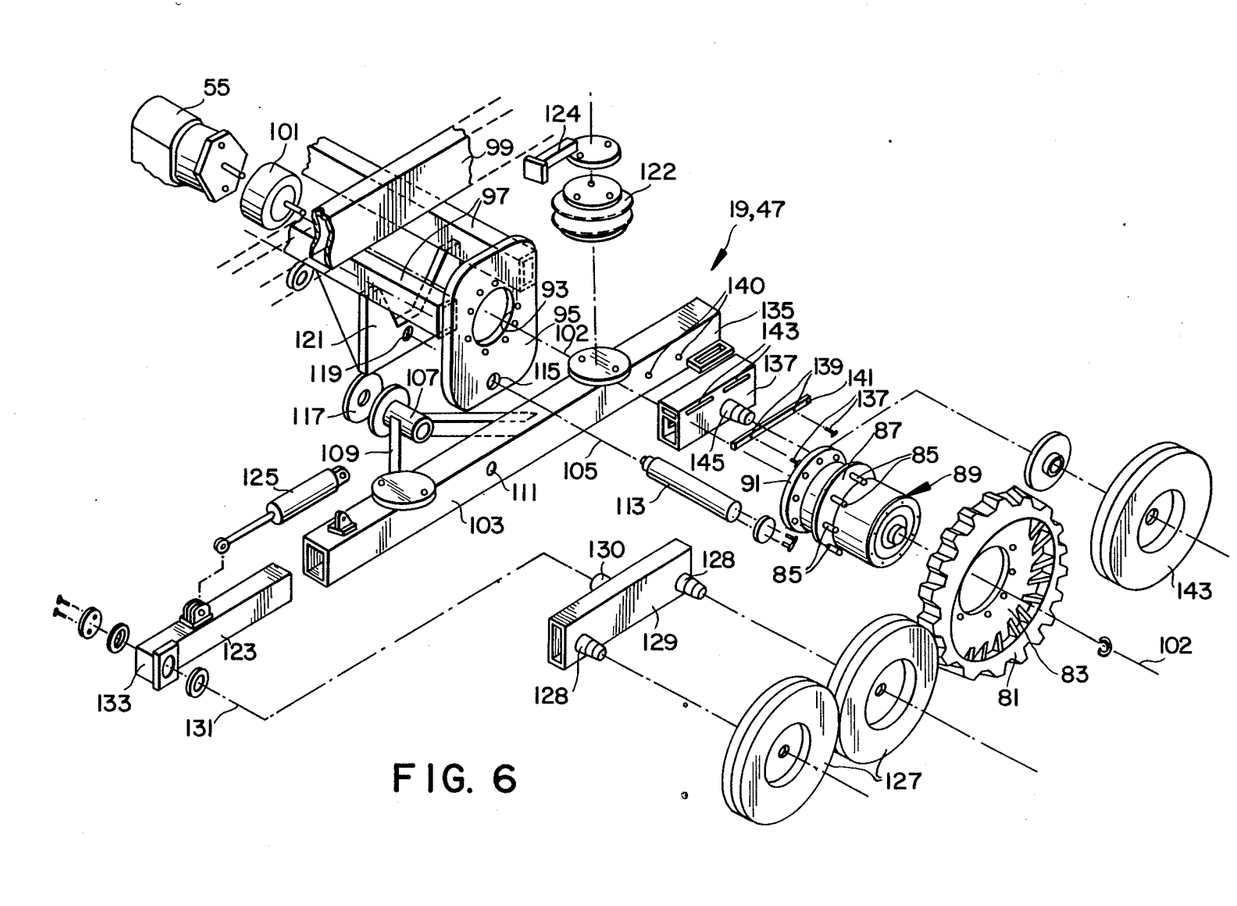
FIG. 6 is an exploded partial view of the four endless-track assemblies of the vehicle.

As all hydraulic motor assemblies 47–53 are identical, only assembly 47 shown in detail in FIG. 6 will be described along with the endless-track assembly 19.

The endless-traction belt 79 (FIG. 1) of the endless-track assembly 19 is brought into motion by a sprocket wheel 81 of which the disk 83 is secured, by bolt means 85, to a radial driving flange 87 of a speed-reducing planet-gear mechanism 89 having a radial support flange 91 fixed with bolts all around a hole 93 acting as a bearing and provided in a vertical bracket plate 95 fixed at the ends of a pair of cross-members 97 secured to a side member 99 of the front body frame 5. The sprocket wheel 81 is rotated by the output shaft of the hydraulic motor 55 through a brake mechanism 101 operatively connected to the planetary gear mechanism 89 which then brings the sprocket wheel 81 into rotation, the latter wheel 81 meshing with the belt 79. The motor assembly 47 is thus made up of the hydraulic motor 55, the brake mechanism 101 and the planetary gear mechanism 89 mounted in front of the hole-bearing 93 in the plate 95. It causes rotation of the sprocket wheel 81 about an axis 102 transverse to the body frame 5.

The endless track assembly 19 further includes an elongated idler-wheel bar 103 mounted, intermediate its ends, for rocking motion about a rock axis 105 parallel to and below the rotation axis 102 of the output shaft of the motor 55. For this purpose, the bar 103 has a rock frame made up of a rock sleeve 107 spacedly secured to it by braces 109; the bore of the sleeve 107 being coaxial with aligned holes 111 through the bar 103. Mounting of the rock frame, and bar 103, on the cross-members 97 is by means of a rock pin 113 extending successively and freely through a hole 115 of the bearing plate 95, through the aligned holes 111 of the bar 103, through the sleeve 107, through a spacing washer 117 and through a hole 119 of a V-shaped further bracket plate 121 fixed to the cross-members 97 behind the vertical bracket plate 95 and parallel to it. The rock axle pin 113 is held in place in any convenient way. In this manner, the idler-wheel bar 103 may rock with respect to the bracket plates 95, 121, and therefore with respect to the front body frame 5. The additional bracket plate 121 may also serve for supporting the motor assembly 47. If desired, cushioning means may be mounted between the cross members 97 (via a bracket 124) and bar 103 on either side of the axis 105, to damper the rocking motion of the bar 103.

The idler-wheel bar 103 is a hollow square member telescopingly receiving at one end, a straight square rod 123 made slidably movable in the bar 103 by a displacing hydraulic jack 125. As shown, two idler-wheels 127 are mounted for free rotation, by means of stub axles 128, at the ends of an elongated idler-wheel support 129 pivoted, at its center by a pin 130, on the free end 133 of the telescoping rod 123 for swinging motion of the support 129 about an axis 131 parallel to the rock axis 105 of the idler-wheel bar 103.

It will be seen also that the other end 135 of the bar 103 has a short block 137 mounted on it for selective positioning along a short length thereof by a pair of screws 137 freely extending through holes 139 of a lock bar 141 and through slots 143 of the block 137 to be finally tightened into tapped holes 140 of the bar 103. An additional idler-wheel 143 is mounted on the block 137 by a stub axle 145 for free rotation about an axis parallel to the rock axis 105 of the idler-wheel bar 103. Obviously, the idlers 127, 143, are sized for operative contact with the lower strand of the traction belt 79, as shown in FIG. 4. It will be appreciated that the latter may easily be tightened or loosened by telescoping rod 123 into the idler-wheel bar 103, at one end, and/or releasably adjusting the position of the block 137, at the other end. A study of FIG. 4 also shows that free rocking of the idler-wheel bar 103, about axis 105, along with the available free swinging motion of the idler-wheel support 129 can allow particularly good traction performance of the endless-track assembly 19 on heavily uneven terrain. The same feature applies to the other assemblies 21, 23, 25, which are of a like construction.

With reference to FIG. 2, it will be appreciated that the pairs of tires 33 may replace the endless-track assembly 19. In this case, the tires would be mounted directly on the planetary mechanism 89 after removal of the sprocket wheel 81 and of the other components of the endless-track assembly 19. Here again, the same rearrangement would be made with the endless-track assemblies 21, 23, 25, which would be replaced by the sets of tires 35, 37, 39.

It has been said above that an essential feature of the invention resides in that the front and rear body frames 5, 13, are connected together by an articulated joint 11 which allows relative lateral oscillation of the body frames about an axis parallel to the longitudinal axis of one of the body frames and located above them. The joint 11 also allows pivotal movement of the body frames 5, 13, about a pivot axis which is perpendicular to the aforesaid oscillation axis. A description now follows of the preferred construction of FIG. 7 having this feature.

Figure 7:
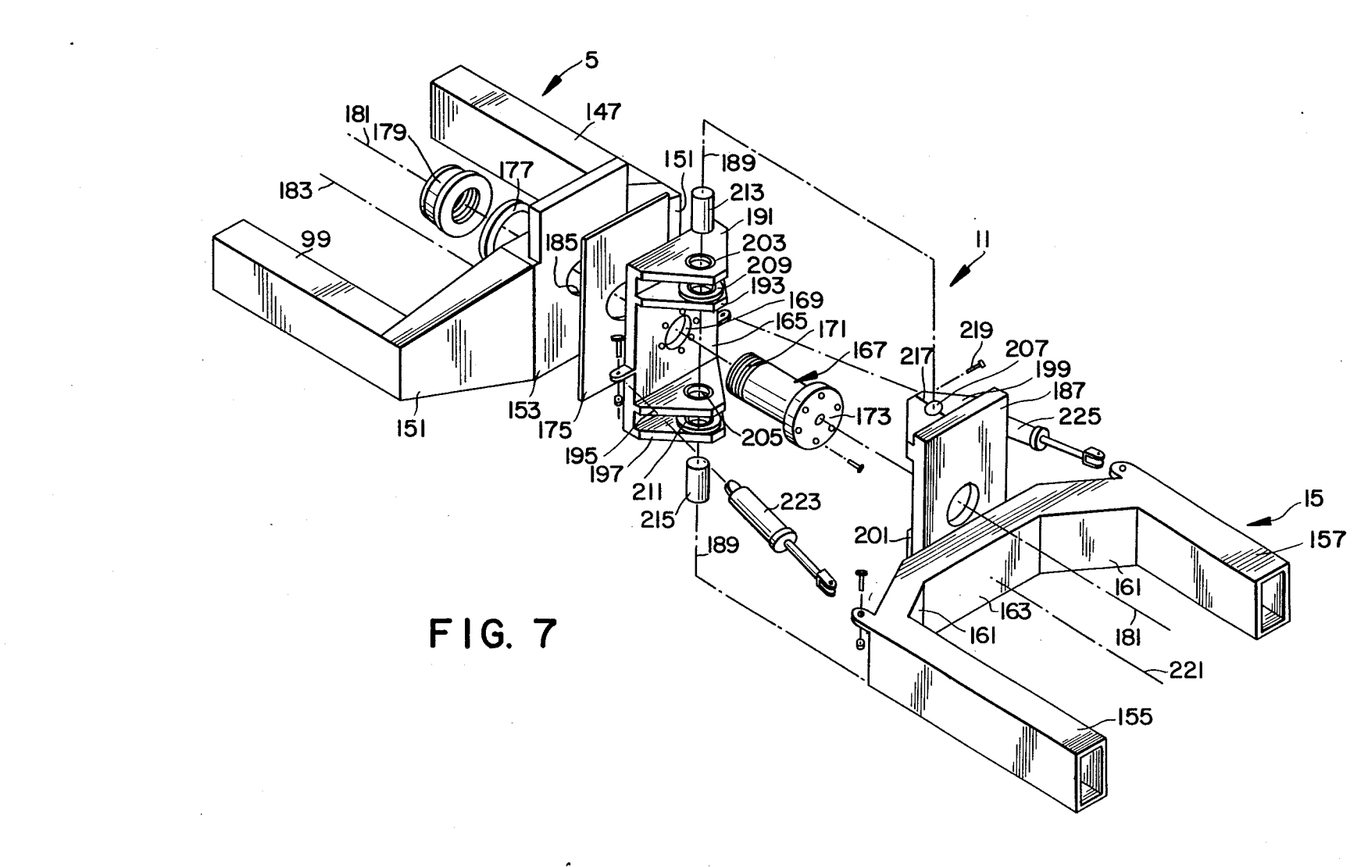
FIG. 7 is an exploded partial view of the articulation joint.

The front frame 5, which is essentially rectangular and planar as shown also in FIG. 3, has the aforesaid side member 99, another side member 147, a front end member 149 (FIG. 3) and a rear end member formed of a pair of bevel sections 151 joined by a central straight section 153. The rear frame 13 is similarly formed of side members 155, 157, rear end member 159 (FIG. 3) and front end member sections 161, 163.

The articulated joint comprises a first articulation member in the form of a flat plate 165 mounted for lateral oscillation on the body frame 5 by an axle pin 167 extending through a hole 169 of the plate 165. The pin 167 is threaded, at 171, at one end and is formed with a terminal flange 173 screwed or otherwise secured to the flat plate 165. The pin 167 is therefore solid with the plate 165. It then extends, freely, successively through an abutment plate 175 solid with the back face of the plate 165; through a hole 185 of the front end central section 153 and through a spacing washer 177 to be screwed into the threaded bore of a blind cap 179. The assembly is such that the flat plate 165 can freely oscillate, with respect to the rear end 151, 153, of the front body frame 5, about an axis 181 located above and parallel to the longitudinal axis 183 of the front body frame 5 and located also above the said frame 5. For this purpose, the hole 185 through the central end section 153 must be located above both the longitudinal axis 183 and the top of the frame 5 a predetermined distance suitable to provide the desired increased stability mentioned previously between the body frames 5, 13. It is then necessary that the central rear end section 153 project above the side members 99, 147. A second articulation member or plate 187 is secured, by any known means such as by welding, to the rear frame 13 so as to project above it. The two plates 165, 187, are joined together to allow relative lateral oscillation of the body frames 5, 13, about the axis 181 as well as their relative pivotal movement about a vertical axis 189 perpendicular to the oscillation axis 181.

For this purpose, the flat plate 165 is formed with a pair of vertically spaced top ears 191, 193, that extend perpendicularly from it in the direction of the other plate 187. It is also formed with a pair of vertically spaced bottom ears 195, 197, that also extend perpendicularly from it in the direction of the other plate 187. Coacting with these ears, are a top bracket 199 and a bottom bracket 201 solid with the flat plate 187 and extending perpendicularly from it in the direction of the plate 165; being suitably spaced apart so as to be received between the top ears 191, 193, and the bottom ears 195, 197, respectively.

The top ears 191, 193, are formed with pivot holes 203, 205, coaxial with the pivot axis 189. Similarly, the brackets 199 are both provided with pivot holes, only one 207 being shown in FIG. 7; these holes also being coaxial with the pivot axis 189. In use, the bottom ears 195, 197, are preferably provided with thrust bearings 209, 211, likewise coaxial with the pivot axis 187. To complete the joint, an upper pivot pin 213 extends through hole 203 of the upper ear 191 and hole 207 of the upper bracket 199 while a lower pivot pin 215 extends through hole 205 of the lower ear 195 and the hole (not shown) of the lower bracket 201. The lower ends of the pivot pins 213, 215, seat on the thrust bearings 209, 211. Finally, any convenient means should be provided to hold the pivot pins 213, 215, in place. This may be obtained by splitting the brackets 199, 201, as at 217, and closing the resulting flexible fingers around the pivot pins 213, 215, by means of screws 219 and suitable coacting bores (not shown).

The flat plate 187 of the rear body frame 13 should be located to ensure that the oscillation axis 181 be spaced from the longitudinal axis 221 of the rear body frame 13 a distance equal to that between axes 181 and 183 in the body frame 5 to ensure that the oscillation motion take place, about the axis 181, at the same distance from the top of both the body frames 5 and 13.

The oscillation motion is best illustrated in FIG. 5.

Lateral adjustment of the body frames to ensure coaxial alignment of the frames longitudinal axes 183, 221, when the vehicle rides in a predetermined direction and steering of the frames may be obtained by the use of a pair of jacks 223, 225, one on each side of the pivot axis 189; the jacks being connected, at their ends, respectively to the flat plate 165 and to the end of the rear body frame 13.

I claim:

1. An all-terrain vehicle comprising:
   a front vehicle body including a generally flat body frame having a longitudinal axis;
   a rear vehicle body including a generally flat body frame having a longitudinal axis;
   an articulated joint connecting said body frames together for allowing relative lateral oscillation of said frames about a roll axis parallel to the longitudinal axis of one of said body frames, said roll axis being located above both of said frames;
   said joint further allowing pivotal movement of said frames about a steer axis perpendicular to said roll axis;
   said articulated joint comprising;
   (1) a first articulation member and means mounting said first member on one of said body frames for relative oscillation of said first member and of said one of said body frames about said roll axis;
   (2) a second articulation member solid with the other of said body frames; and
   (3) means joining said two articulation members together, said means being constructed to allow said relative oscillation and said pivotal movement of said body frames;
   four motor assemblies each including a pressure-fluid operated motor having an output shaft;
   means mounting two of said motor assemblies on said front body frame with the output shafts thereof being coaxial and extending laterally outwardly of said front body frame;
   means mounting the remaining two motor assemblies on said rear body frame with the output shafts thereof being coaxial and extending laterally outwardly of said rear body frame;
   pressure fluid generating means on one of said body frames, said generating means including fluid piping operatively connected to said motors to supply pressure fluid thereto for rotating said shafts; wherein a portion of said piping extends between said body frames and is flexible for easing said relative lateral oscillation and said pivotal movement of said body frames; and four ground-engageable traction means, each connected to one of said output shafts for propelling said vehicle over the ground.

2. An all-terrain vehicle as claimed in claim 1, wherein said articulation members are essentially flat plates and said joining means comprise:

a pair of top vertically spaced parallel ears and a pair of bottom vertical spaced parallel ears projecting perpendicularly from one of said flat plates toward the other plate;

a top bracket and a bottom bracket projecting perpendicularly from the other of said plates toward said one of said plates and being respectively received between said pairs of ears, and pivot pin means including a pair of pins extending perpendicularly of and through said ears and brackets for allowing relative pivoting movement of said front and rear body frames.

3. An all-terrain vehicle as claimed in claim 2, further comprising:

a pair of jacks, one on each side of said steer axis, for the lateral selective adjustment of said body frames, said jacks being connected at the ends thereof respectively to one of said flat plates and to one of said body frames facing said one of said flat plates, constructed to allow relative pivotal movement of said body frames.

4. An all-terrain vehicle as claimed in claim 2, wherein said first articulation member is mounted for oscillation on the rear end of said front body frame and said second articulation member is secured to the front end of said rear body member.

5. An all-terrain vehicle as claimed in claim 4, wherein said pressure fluid generating means are mounted on said front body frame.

6. An all-terrain vehicle as claimed in claim 5, wherein said motor assemblies are hydraulic motor assemblies.

7. An all-terrain vehicle as claimed in claim 1, wherein said ground-engaging traction means are endless-track assemblies, each of said assemblies comprising:

an endless traction belt and a sprocket wheel driving said belt into rotation, said sprocket wheel being operatively connected to the output shaft of one of said motor assemblies;

an elongated idler-wheel bar mounted, intermediate the ends thereof, on the mounting means for said one of said motor assemblies for rocking motion of said bar about a rock axis parallel to the rotation axis of said output shaft, and idle wheels mounted at the ends of said rocking bar for free rotation and for operative contact with said traction belt.

8. An all-terrain vehicle as claimed in claim 7, wherein said rock axis of said idler-wheel bar is located beneath the rotation axis of said output shaft.

9. An all-terrain vehicle as claimed in claim 8, wherein said motor assemblies are hydraulic motor assemblies.

10. An all-terrain vehicle as claimed in claim 7, wherein said articulation members are essentially flat plates and said joining means comprise:

a pair of top vertically spaced parallel ears and a pair of bottom vertical spaced parallel ears projecting perpendicularly from one of said flat plates toward the other plate;

a top bracket and a bottom bracket projecting perpendicularly from the other of said plates toward said one of said plates and being respectively received between said pairs of ears, and pivot pin means including a pair of pins extending perpendicularly of and through said ears and brackets for allowing relative pivoting movement of said body frames of said front and rear vehicle bodies, respectively.

11. An all-terrain vehicle as claimed in claim 1, wherein said ground-engaging means are pneumatic tire means operatively connected to the output shafts of said motor assemblies.

12. An all-terrain vehicle as claimed in claim 11, wherein said front body frame has a rear end and said rear body frame has a front end, said articulation joint being provided between said ends and comprising:

a first articulation member and means mounting said first member on one of said body frame ends for oscillation thereof about said oscillation axis;

a second articulation member solid with the other of said body frame ends, and means joining said two articulation members together for allowing said relative lateral oscillation and relative pivoting movement of said body frames.

13. An all-terrain vehicle as claimed in claim 12, wherein said articulation members are essentially flat plates and said joining means comprise:

a pair of top vertically spaced parallel ears and a pair of bottom vertical spaced parallel ears projecting perpendicularly from one of said flat plates toward the other plate;

a top bracket and a bottom bracket projecting perpendicularly from the other of said plates toward said one of said plates and being respectively received between said pairs of ears, and pivot pin means including a pair of pins extending perpendicularly of and through said ears and brackets for allowing said relative pivoting movement of said body frame.

14. An all-terrain vehicle, comprising:

a front and a rear body frame, each having a longitudinal axis;

an articulated joint connecting said body frames together and constructed for allowing relative lateral oscillation of said frames, about an oscillation axis parallel to the longitudinal axis of one of said body frames and located above both of said frames, and for allowing relative pivoting movement of said frames about a pivot axis perpendicular to said oscillation axis;

four motor assemblies each including a pressure-fluid operated motor having an output shaft;

means mounting two of said motor assemblies on said front body frame with the output shafts thereof being coaxial and extending laterally outwardly of said front body frame;

means mounting the remaining two motor assemblies on said rear body frame with the output shafts thereof being coaxial and extending laterally outwardly of said rear body frame;

pressure fluid generating means on one of said body frames, said generating means including fluid piping operatively connected to said motors to supply pressure fluid thereto for rotating said shafts; wherein a portion of said piping extends between said body frames and is flexible for easing said relative lateral oscillation and said pivotal movement of said body frames;

four ground-engageable traction means, each connected to one of said output shafts for propelling said vehicle over the ground;

wherein said ground-engaging traction means are endless-track assemblies, each of said assemblies comprising:
   an endless traction belt and a sprocket wheel driving said belt into rotation, said sprocket wheel being operatively connected to the output shaft of one of said motor assemblies;
   an elongated idler-wheel bar mounted, intermediate the ends thereof, on the mounting means for said one of said motor assemblies for rocking motion of said bar about a rock axis parallel to the rotation axis of said output shaft, and idle wheels mounted at the ends of said rocking bar for free rotation and for operative contact with said traction belt;

wherein said bar is hollowed out at one end thereof, and said vehicle further comprises:
   a rod telescopically received in said one end of said bar and means for telescoping said rod in said bar;
   an elongated idler-wheel support and means mounting said support on said rod for swinging motion of said support about a swing axis parallel to said rock axis of said idler-wheel bar, and wherein
   two of said idler-wheels are mounted for free rotation on said support, one on each side of said swing axis.

15. An all-terrain vehicle as claimed in claim 14, further comprising:
   a block and screw means for selectively positioning said block on said rocking bar, at the other end and lengthwise thereof, and
   a further idler wheel mounted on said block for free rotation about an axis parallel to said rock axis of said idler wheel rocking bar.

* * * * *